United States Patent [19]
Thompson

[11] Patent Number: 5,934,171
[45] Date of Patent: Aug. 10, 1999

[54] FLEXIBLE MOUNT FOR HYDRAULIC/ PNEUMATIC CYLINDER AND THE LIKE

[75] Inventor: Paul S. Thompson, Santee, Calif.

[73] Assignee: Cymer, Inc., San Diego, Calif.

[21] Appl. No.: 08/900,203

[22] Filed: Jul. 24, 1997

[51] Int. Cl.[6] ............................................... F01B 29/00
[52] U.S. Cl. ............................................... 92/161; 92/128
[58] Field of Search ............................. 92/161, 146, 128, 92/169.1; 248/560, 561, 637

[56] References Cited

U.S. PATENT DOCUMENTS

| | | | |
|---|---|---|---|
| 3,915,064 | 10/1975 | Dancs | 92/161 |
| 4,073,218 | 2/1978 | Pollinger | 92/169.3 |
| 4,488,701 | 12/1984 | Leigh-Monstevens | 248/637 |
| 4,599,860 | 7/1986 | Parsons | 60/584 |
| 4,688,774 | 8/1987 | Warmuth, II | 92/98 D |

*Primary Examiner*—Thomas E. Denion
*Attorney, Agent, or Firm*—Brian D. Ogonowsky

[57] ABSTRACT

Disclosed are techniques and apparatus for flexibly mounting a mechanism. The embodiments describe a flexible mount that is at once tolerant of misalignment, shock resistant, insensitive to rotational orientation, compact, and failure resistant. A mechanism is rigidly attached to a retainer that interlocks with a stationary housing and confines and compresses annular resilient members. The methods may in particular apply to the mounting of hydraulic and pneumatic cylinders for actuation of a shutter assembly in an optical system. In addition the techniques can apply to the flexible mounting of other mechanisms incorporating movable members having axes of symmetry, including push rods and rotating shafts.

20 Claims, 7 Drawing Sheets

FLEXIBLE MOUNT FOR HYDRAULIC/PNEUMATIC CYLINDER AND THE LIKE

FIELD OF THE INVENTION

The present invention relates to a flexible mounting apparatus and method for supporting a hydraulic or pneumatic cylinder and piston mechanism, particularly in conjunction with lasers and optical systems.

BACKGROUND

Pneumatic and hydraulic cylinders are commonly used in a variety of applications. In laser and optical systems, it is often important to open and block the optical transmission path remotely on command. For this purpose pneumatic or hydraulic cylinders are frequently used to actuate an optical shutter mechanism. Generally a shutter blocks the laser output beam or optical transmission path unless it is deliberately removed from the beam or path. Often the shutter incorporates a mirror surface disposed at an angle with respect to the beam, such that the blocked beam is deflected from its normal path into an optical absorber or "beam dump."

Commonly the shutter is rigidly mounted to a mechanical stage that slides on a rail disposed at substantially a right angle to the beam path. Actuation of the shutter is effected by the extension and retraction of a piston rod attached to the mechanical stage and driven by pressurized gas or hydraulic fluid in a pneumatic or hydraulic cylinder. A piston connected to a piston rod is slidably mounted internal to the cylinder. A system of valves admits pressurized hydraulic fluid or compressed gas, for example air, into the cyinder on one side of the piston, whereupon the piston and connected rod translate axially under the force created by the pressure differential across the cylinder. Depending on which side of the piston is pressurized, the rod either extends or retracts until it reaches the limit of its travel, typically controlled by stops internal to the cylinder. The direction of motion reverses when the pressure differential reverses under control of the valves, or when the pressure is released through a valve and the piston motion is reversed under spring tension. When the rod is extended, the beam path is blocked; when the rod is retracted, the beam path is open. For safety reasons the cylinder is generally configured so that the rod is normally extended, and thus the optical path is blocked, if the cylinder is not pressurized.

Figure 1:
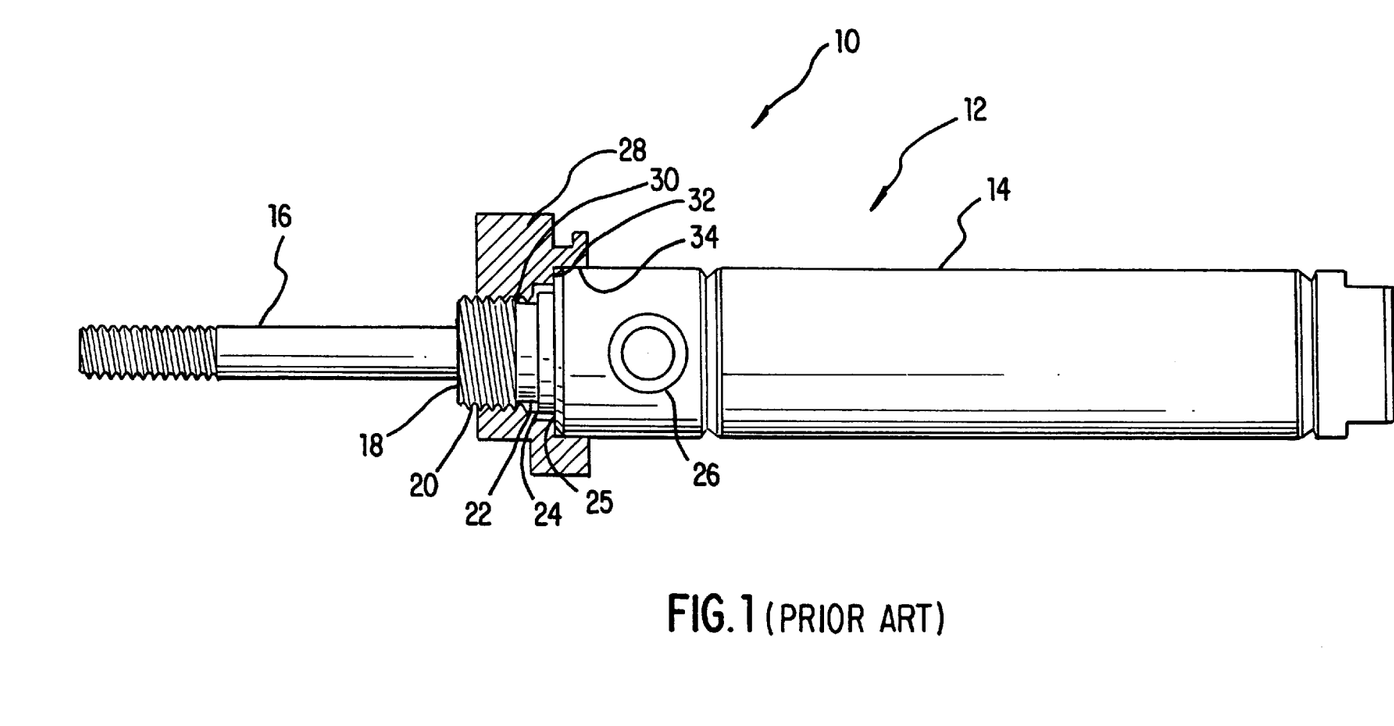
FIG. 1 illustrates a prior art cylinder mounting arrangement.

Alignment of the piston rod axis with the slide rails for the shutter stage can be critical. Unless these are parallel, the mechanism may bind mechanically. This can result in friction, uneven travel of the shutter stage, chatter and vibration, improper positioning of the shutter, jamming of the shutter mechanism, or damage to the sliding stage, rod, or cylinder. Cylinders are generally mounted rigidly to a system base plate or housing. FIG. 1 illustrates an example of this prior art method. Small offsets or angular misalignments between the cylinder axis and the slide rails can lead to catastrophic shutter failure.

Achieving the required alignment upon assembly and installation of a shutter is typically a highly sensitive, skill-intensive, and time-consuming operation, involving successive minute adjustments of the mechanical components interspersed with sequential loosenings and tightenings of the associated fasteners. It would be highly desirable to have a cylinder mount that could accommodate small to moderate offsets and angular misalignments of the cylinder axis, allowing the latter to conform automatically to the slide rail axis.

Misalignment solutions typically take the form of couplers, generally attached to the end of the rod distal to the cylinder, that offer latitude in tilt, offset, or both. One version uses an elastomeric coupler that flexes. Although it may isolate shock somewhat, it can also fail, causing the rod to become separated from the load. None of these flexible couplers facilitates freedom of rotational orientation, and the additional length of the coupler cannot always be tolerated. Examples are DMA-series cylinder rod couplers manufactured by the Mead company of Chicago, Ill.; cylinder rod couplers manufactured by Compact Air Products, Inc., of Westminster, S.C. (Bulletin #CRC); and NJ-series cylinder rod couplers manufactured by SMC Pneumatics, Inc., of Indianapolis, Ind.

It would also be desirable to have a cylinder mount that could provide cushioning of mechanical shocks that occur at the ends of the piston stroke. Inadequately damped mechanical shock can produce excess noise, vibration of the mechanical and optical assemblies, and wear or early failure of components.

Shock management can be handled a number of ways, but usually by isolation or absorption. Hydraulic or pneumatic dampeners absorb the shock, converting the energy to heat. These shock absorbers are mounted so that the load contacts a piston rod just before the end of a stroke. This slows the load before it strikes a solid stop. These dampeners are effective, but they are expensive and require extra space. A more common method is to place resilient bumpers on the piston inside the cylinder. This does an adequate job and adds little to space, but it does not facilitate alignment or rotation at all. Examples are CF-series, CR-series, and CB-series cushions manufactured by the Mead company of Chicago, Ill.; and NCG-series and NCJ-series cylinders manufactured by SMC Pneumatics, Inc., of Indianapolis, Ind.

An additional desirable feature would be the ability to mount the cylinder at any rotational orientation about its own axis. This would provide flexibility for convenient access to any fittings located on the side wall of the cylinder.

Rotational orientation of the fitting is possible with two types of mount. The main body of the cylinder can be clamped in a squeeze block that, in turn, is mounted to a system support member. Prior to tightening the clamping fasteners, the cylinder can be rotated at will about the piston rod axis. A threaded-nose cylinder protruding through a bracket can be oriented as needed before tightening a nut on the other side of the bracket, although this is limited to situations that allow access to the nut. Neither type allows for misalignment or shock isolation. Examples are 12000-series cylinder-mounting squeeze blocks and 15000-series foot mounting brackets manufactured by Clippard Instrument Laboratory of Cincinnati, Ohio.

Another shortcoming of existing cylinder mounts is the difficulty of threading the piston rod into a load or other object. Existing versions require an estimate of when to engage the cylinder nose threads in order to achieve the proper tightened depth of the threaded rod. Alternatively a tool must be used to grip and twist the rod to achieve proper depth. This may be difficult to access and vulnerable to scratching the rod surface, which is polished to form a sliding seal with the nose of the cylinder.

Compactness would be an attractive feature of any improved cylinder mounting solution. Space is typically at a premium in any laser or optical system. In particular, compactness is important if the improved mount is to be retrofitted into an existing system or design, where dimensional constraints are generally already fixed.

Accordingly, there is a need for a hydraulic or pneumatic cylinder mount that is simultaneously self-aligning, shock-isolating, insensitive to rotational orientation, and compact. There is no known device that provides all of these features and only one known device that provides two features out of the four. All known devices that correct for misalignment add to the overall length of an assembly, thus requiring redesign and making retrofitting difficult or impossible.

SUMMARY

The present flexible mount is unique in that it is self-aligning, isolates shock, permits rotational orientation as desired, and typically fits within little more space than a conventional solid threaded mount. In one embodiment the invention comprises a compact mounting adapter for threaded-nose hydraulic or pneumatic cylinders to replace a rigid threaded mount with a flexible one that provides shock isolation, self-alignment capability and orientation insensitivity within substantially the same compact space. The cylinder threads into the flexible mounting adapter that, in turn, mounts rigidly into a support structure of the system. In one embodiment resilient "O"-rings are used to support the cylinder and isolate it within the mount. A suitable retainer prevents separation of the cylinder from the mount and limits or influences movement of the cylinder within the mount. A resilient mount allows the cylinder to tilt in the event of angular misalignment, thus relieving side loads that might cause binding, and it reduces the transmission of shock and noise to the mounting structure. It also allows the cylinder to rotate about its own axis with any orientation, so that features or fittings on the side of the cylinder can be positioned as desired, and facilitates threading of the piston rod with accurate depth into a load or other object.

The mount protects the cylinder mechanism against damage from excessive side loads applied to the mechanism body, as when using the cylinder body as a handle for carrying an assembly. It also protects against damage to the mount itself. A collar integral with the mount housing encircles the cylinder body with clearance and acts as a rigid stop to limit lateral tilt and offset displacement. This is augmented by a second rigid stop defined by clearance between the outer diameter of a flange of the retainer and the walls of a counterbore in the mount housing. These solid stops limit side loading of the resilient members and prevent excessive tilt that could deform or damage a cylinder mechanism.

In one preferred embodiment the retainer may incorporate locking threads on its inside diameter. The outside diameter of the retainer serves in turn as an inner diameter for two "O"-rings and also as a longitudinal end wall for one of these "O"-rings.

The flexible mount fits within substantially the same length as the conventional rigid threaded mount and, therefore, does not require relocation of the cylinder for a redesign or retrofit. Furthermore, a retrofit is cosmetically substantially identical with the original rigid threaded mount.

In a preferred embodiment the retainer tightens and seats solidly against a rigid surface of a cylinder. This positive positioning makes the elastic and frictional properties of the mount independent of torque applied to tighten the retainer during assembly of the mount, whereas seating against a non-rigid surface would render these properties torque-dependent. Rigid seating furthermore prevents the retainer from loosening during operation. Thus the tightness of the retainer is not affected by aging, shrinkage, or failure of the elastomeric members of the mount. Even in the event of total failure or disintegration of the "O"-rings, the retainer maintains its position, thus interlocking the cylinder with the mount, allowing the cylinder mechanism to remain supported in the mount and to function.

In a preferred embodiment the elastomeric members are always compressively loaded, with the load limited by rigid stops. Additional protection is gained by designing the mount so that the elastomeric members are substantially confined within annular-shaped cavities defined by rigid walls on inner and outer diameters and on both front and rear longitudinal surfaces, such that deformation of the elastomeric members is restricted in every direction. Once the cavity is totally filled with elastomer, this results in a rapid rise in spring constant to that exhibited in hydrostatic compression of a solid material.

The embodiments thus provide a flexible cylinder mount that is at once tolerant of misalignment, shock resistant, insensitive to rotational orientation, compact, and failure resistant.

In addition to hydraulic and pneumatic cylinders, the invention is applicable to the flexible mounting of other mechanisms incorporating reciprocating or rotating members having axes of symmetry, including push rods and rotating shafts.

DETAILED DESCRIPTION OF THE PREFERRED EMBODIMENTS

FIG. 1 illustrates the rigid mounting arrangement 10 of a hydraulic or pneumatic cylinder 12 in accordance with the prior art. Cylinder 12 comprises a cylinder body 14, a piston rod 16 rigidly connected to a piston (not shown) which is slidably mounted internal to cylinder body 14, and a threaded nose section 18, typically containing external threads 20, a thread relief 22, an annular boss 24 concentric with the axis of rod 16, and a solid end wall 25. Cylinder body 14 may also contain a side fitting 26 for the purpose of connecting to a supply of pressurized hydraulic fluid or gas 36 (see FIG. 2), for example compressed air, to actuate the piston. In accordance with the prior art, cylinder 12 is mounted rigidly to a system bulkhead 28 by engaging external threads 20 with internal threads 30 in bulkhead 28 and tightening securely to press end wall 25 of cylinder 12 against an annular seat 32 at the bottom of a counterbore 34 concentric with the axis of internal threads 30 in bulkhead 28. This rigid mounting arrangement has the disadvantages of allowing no lateral misalignment without deformation or damage to cylinder 12 or piston rod 16; providing little or no mechanical shock absorption; and permitting no latitude for rotational orientation to determine the location of side fitting 26.

Figure 2:
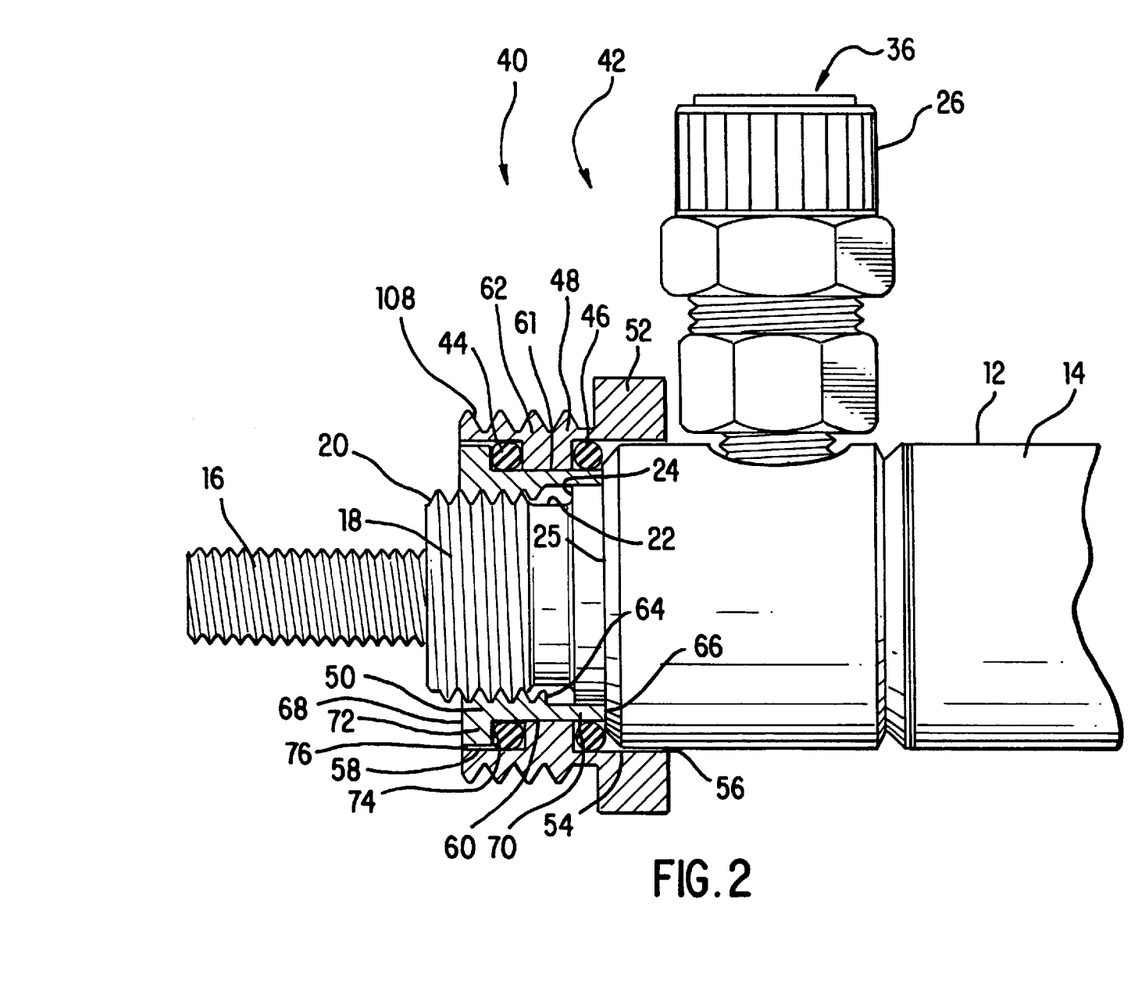
FIG. 2 illustrates a first embodiment of the present invention.

FIG. 2 illustrates a piston and cylinder arrangement incorporating one embodiment of the present invention, in which features of the prior art rigid mounting arrangement 10 are replaced by features of a flexible mounting arrangement 40. Cylinder 12 threads into a flexible mounting adapter 42 that, in turn, is rigidly fastened to a support member, for example a bulkhead (not shown) of the system. In embodiment 40, resilient "O"-rings 44, 46 are used to support the cylinder and isolate it within a housing 48. A retainer 50 prevents separation of threaded cylinder nose 18 from housing 48 and limits or influences movement of the cylinder within the housing.

The resilient material of the "O"-rings is preferably elastomeric silicone rubber or nitrile, and their sizes and durometer ratings are selected for compatibility with the dimensions and loading of the cylinder in accordance with engineering principles familiar in the art. "O"-rings of various cross-sectional shapes may be used, depending on engineering preference. These cross-sectional shapes include circular, four-lobe or "quad ring," and square (commonly described as lathe-cut).

The materials from which housing 48 and retainer 50 may be fabricated include metals, rigid plastics, composites, and other durable, rigid structural materials. Fabrication processes may include machining, casting, molding, stamping, and combinations thereof.

A collar 52 integral with housing 48 at one end, for convenience designated as the rear end, encircles the periphery of cylinder body 14 inside a counterbore 54 with an annular clearance 56, and acts as a rigid stop to limit lateral tilt and displacement of cylinder 12. A second counterbore 58 concentric with counterbore 54 is contained in the opposite end of housing 48, for convenience designated as the front end. Housing 48 also contains a through hole diameter 60, 61 through an internal step 62 and concentric with front and rear counterbores 58 and 54.

Retainer 50 incorporates inside threads 64 which engage external threads 20 on the nose section of cylinder 12. Inside threads 64 may comprise locking threads. The rear face 66 of retainer 50 is securely tightened against end wall 25 of cylinder 12. The front face 68 of retainer 50 may be slotted radially for insertion of a blade, tangs, or other appropriate tool, or may be otherwise configured to facilitate tightening.

The outside diameter 70 of retainer 50, smaller than the inside diameter of through hole 60, 61, serves in turn as an inner diameter for "O"-rings 44, 46. Retainer 50 also incorporates a flange 72 having an inner face 74 that serves as an end wall for the front "O"-ring 44. Flange 72 prevents retainer 50 from passing entirely through housing 48. An annular clearance 76 between the outer diameter of flange 72 and the inner diameter of front counterbore 58 defines an auxiliary rigid stop as a back-up to rear clearance 56 to limit side loading of the resilient "O"-rings 44, 46 and prevent excessive tilt that could deform the cylinder mechanism.

In a preferred embodiment retainer 50 tightens and seats solidly against rigid end wall 25 of cylinder 12 by means of inside threads 64 of retainer 50 engaging external threads 20 of cylinder 12. Flange 72 of retainer 50 thereby interlocks cylinder 12 with housing 48 and produces longitudinally compressive forces on "O"-rings 44, 46. In other embodiments a means to attach retainer 50 rigidly to cylinder 12 may comprise press fitting or individual fasteners. The positive seating of rigid retainer 50 against rigid cylinder end wall 25 keeps the elastic and frictional properties of the mount independent of torque applied to tighten retainer 50 against cylinder wall 25, whereas seating against a non-rigid surface would render these properties torque-dependent. Rigid seating furthermore prevents retainer 50 from loosening during operation. The tightness of retainer 50 will therefore not be affected by aging, shrinkage, or failure of elastomeric "O"-rings 44, 46 of the mount. Even in the event of complete failure or disintegration of "O"-rings 44, 46, retainer 50 maintains its position, and cylinder 12 remains interlocked with the mount and functional.

To assemble, front "O"-ring 44 is placed around outside diameter 70 of retainer 50 adjacent to flange 72. This subassembly is then inserted into housing 48 such that front "O"-ring 44 and flange 72 are recessed within front counterbore 58 of housing 48 and outside diameter 70 of retainer 50 extends through the through hole diameter 60, 61 of housing 48. Rear "O"-ring 46 is recessed between outside diameter 70 of retainer 50 and rear counterbore 54 of housing 48. Threaded nose 18 and end wall 25 of cylinder 12 are then inserted into counterbore 54 such that piston rod 16 is substantially concentric with the axis of retainer 50. External threads 20 of cylinder 12 engage inside threads 64 of retainer 50. The rotational orientation of cylinder 12 is adjusted as desired, and retainer 50 is tightened rigidly against cylinder end wall 25 using an appropriate tool. The entire cylinder and mount assembly 40 may then be fastened as a unit to a system support member or bulkhead, pressurized gas or hydraulic fittings may be installed, and the piston rod 16 may be connected to a load.

Although preferably integrally formed with retainer 50, flange 72 may alternatively be threaded, press fit, soldered, welded, secured by individual fasteners, or otherwise rigidly affixed to retainer 50. Although the geometry of flange 72 as hereinabove described is substantially annular, other shapes that extend beyond outside diameter 70 of retainer 50 may be employed, including but not limited to toothed wheel and cruciform shapes.

In a preferred embodiment the elastomeric members, for example "O"-rings 44, 46, are always compressively loaded, with limitation of the load by rigid stops. Additional protection is gained by designing mount 42 so that elastomeric members, for example "O"-rings 44, 46, reside in annular-shaped cavities defined by rigid walls on inner and outer diameters and on both front and rear longitudinal surfaces, such that the deformation of elastomeric members is restricted in every direction. This results in a rapid rise in spring constant to that of hydrostatic compression of a solid, once the cavity is totally filled with elastomer.

Certain design parameters are of particular importance. These relate to control of the radial and longitudinal deformations of both front and rear "O"-rings 44, 46, and to the annular clearances, in particular rear clearance 56. Clearance 56 dictates the maximum lateral tilt or offset of cylinder 12. Radial deformation of either "O"-ring 44, 46 affects its elastic, frictional, and drag properties, and the radial deformation of either "O"-ring 44, 46 affects the longitudinal position of both "O"-rings. It is advisable to minimize deformation of rear "O"-ring 46, thereby minimizing its influence on drag and longitudinal position. These design objectives can be achieved through careful control of the dimensions of mount housing 48 and retainer 50, using a knowledge of the "O"-ring properties and system loads, and applying engineering and design methods familiar in the art.

Hereinabove described flexible mount 42 allows cylinder 12 to tilt in the event of angular misalignment, thus relieving side loads that may cause binding, and it reduces the transmission of shock and noise to the mounting structure. It also allows cylinder 12 to be rotated about its own axis to any orientation, so that features or fittings on the side of the cylinder can be positioned as needed. Flexible mount 42 fits within substantially the same length as a conventional rigid threaded mount and, therefore, does not require relocation of the cylinder for a redesign or retrofit. Furthermore, the retrofit may be cosmetically substantially identical with the replaced rigidly threaded mount.

Flexible mount 42 protects cylinder mechanism 12 against damage from excessive side loads applied to cylinder body 14, as when using the cylinder body as a handle for carrying an assembly. It also protects against damage to mount 42 itself.

Embodiment 40 thus provides a flexible cylinder mount that is at once tolerant of misalignment, shock resistant, insensitive to rotational orientation, compact, and failure resistant.

Intact "O"-rings 44, 46 in hereinabove described embodiment 40 may provide the additional benefit of a fluid, pressure, or vacuum seal to isolate the space surrounding body 14 of cylinder 12 from the space surrounding front end 18 of cylinder 12 and piston rod 16, facilitating the use of embodiment 40 in a situation in which different media fill the respective spaces.

Figure 3:
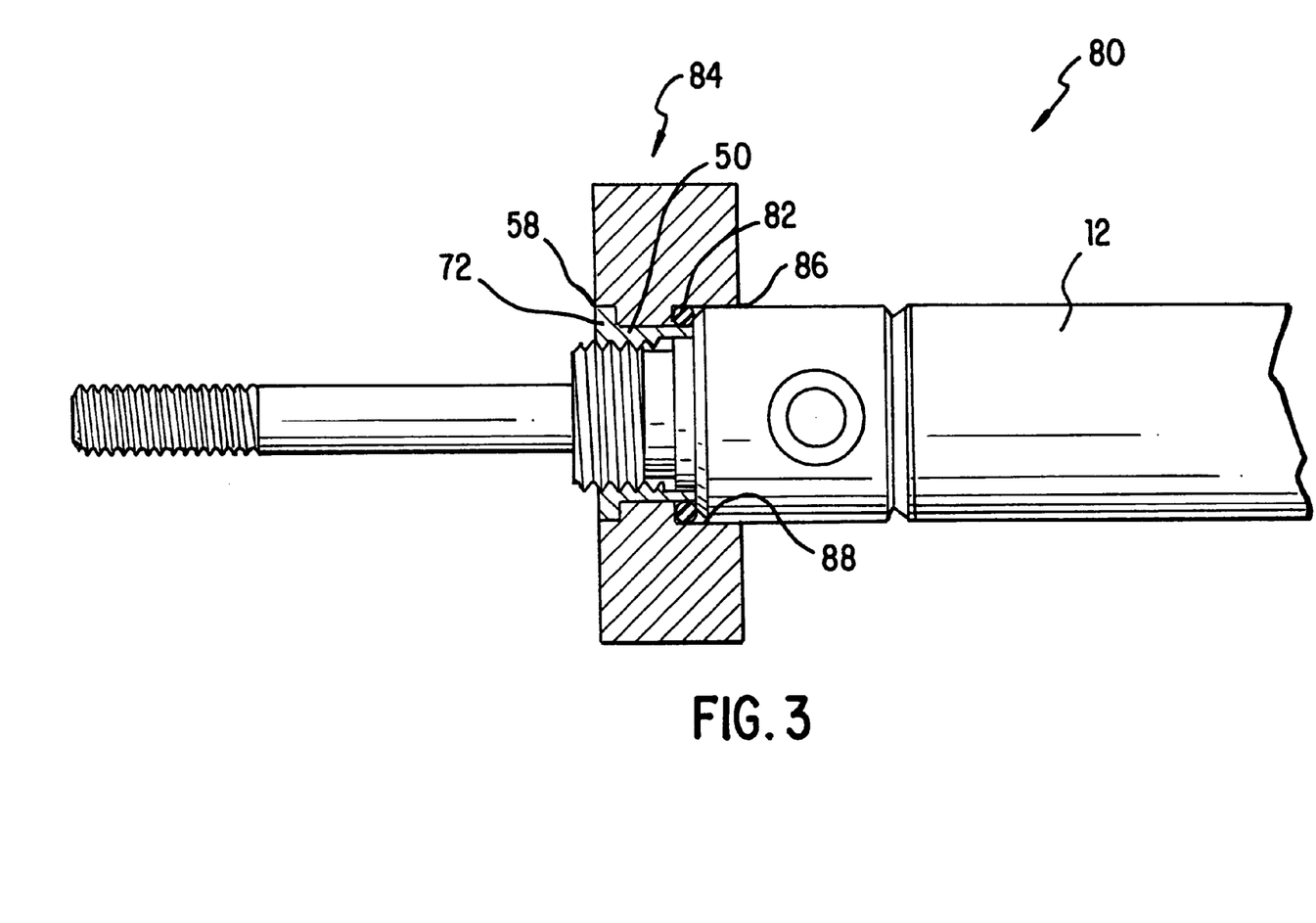
FIG. 3 illustrates a second embodiment of the present invention.

FIG. 3 illustrates a second embodiment 80 of the invention, wherein a single elastomeric member, for example "O"-ring 82, is used at only one end of a mount 84, thereby providing rigidity in one direction and shock absorption in the other direction. Flange 72 of retainer 50 seats within counterbore 58 of mount 84 under the compressive force exerted by "O"-ring 82. Therefore, as illustrated cylinder 12 is rigidly prevented from longitudinal motion in the rearward direction, but may move longitudinally against the shock absorbing cushion of "O"-ring 82 in the forward direction, and may tilt laterally about a pivot defined by flange 72 and counterbore 58. Annular clearance 86 is provided between cylinder 12 and counterbore 88 of mount 84, which limits side loading of "O"-ring 82 and limits the maximum lateral tilt or offset of cylinder 12.

In a variation of embodiment 80, single elastomeric "O"-ring 82 may be positioned in the opposite end of mount 84 between retainer flange 72 and counterbore 58. In the latter variation, operation would be similar to that of embodiment 80 described hereinabove, except that forward and rearward directions would be reversed.

Figure 4:
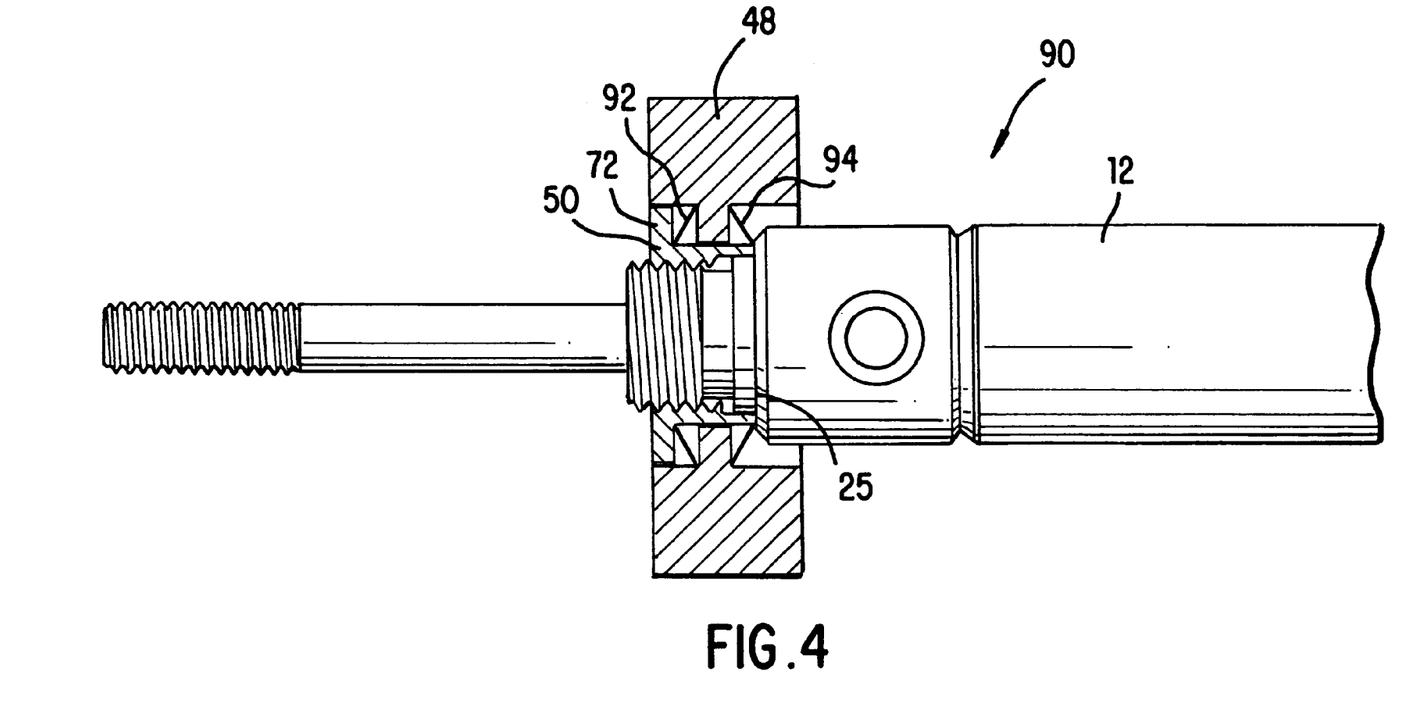
FIG. 4 illustrates a third embodiment of the present invention.

FIG. 4 illustrates a third preferred embodiment 90 of the invention, in which elastomeric "O"-rings are replaced by spring washers 92, 94. Spring washers 92, 94 are assembled under compression longitudinally between retainer flange 72 and cylinder end wall 25 and with clearance radially between retainer 50 and housing 48. In this configuration spring washers 92, 94 provide resilient mounting to cylinder 12, providing lateral tilt and offset misalignment capability, shock absorption, and rotational orientation insensitivity. A variety of spring washer familiar in the art is known as a "Belleville Washer." Embodiment 90 may be attractive in situations in which spring washers may be preferred over elastomeric "O"-rings because of greater durability.

Figure 5:
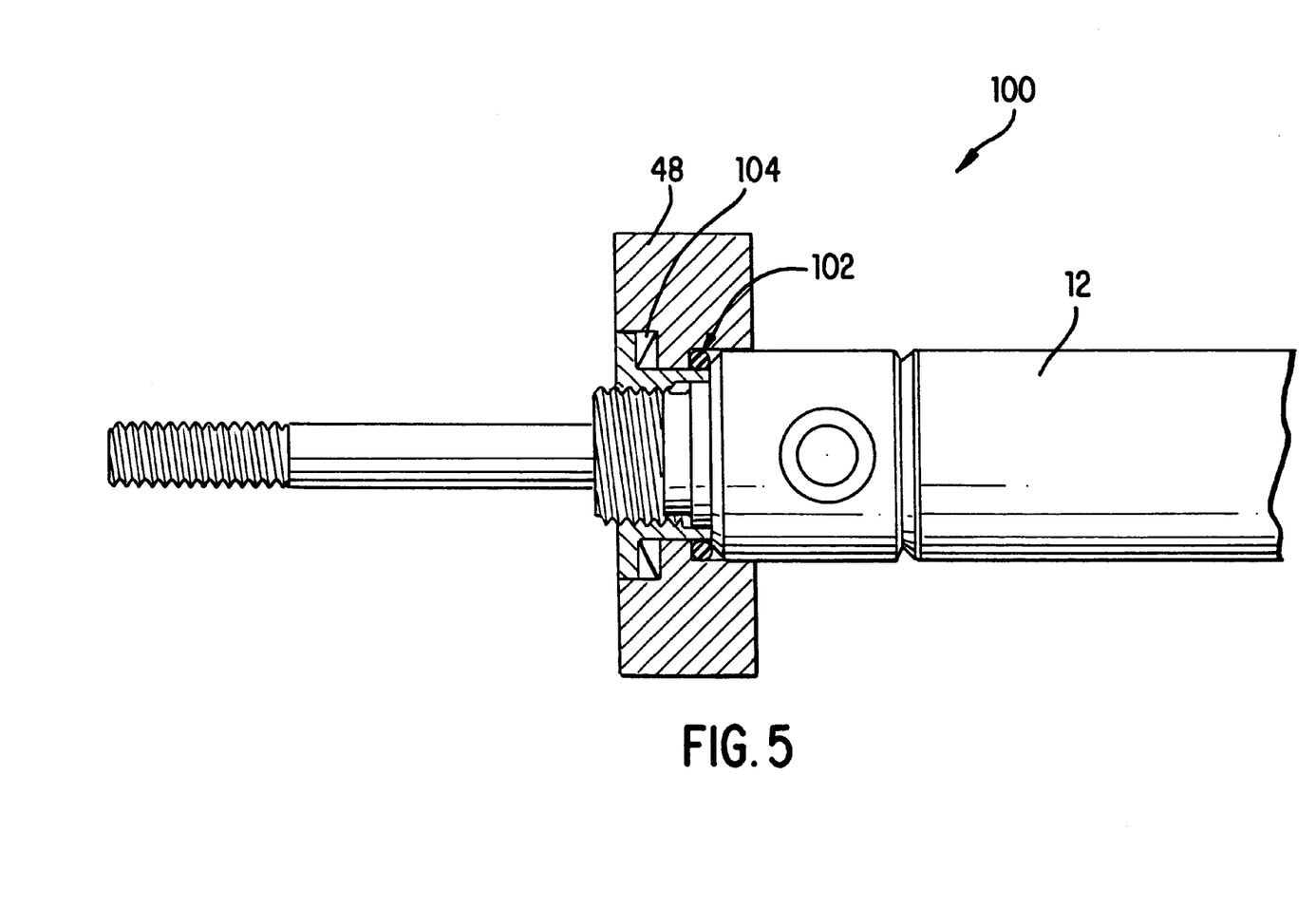
FIG. 5 illustrates a fourth embodiment of the present invention.

FIG. 5 illustrates a hybrid embodiment 100 in which one resilient member comprises an "O"-ring 102 and a second resilient member comprises a spring washer 104. Assembly and operation are substantially the same as for the embodiments 40 and 90 illustrated respectively in FIG. 2 and FIG. 4. A potential application of embodiment 100 may be to take advantage of the sealing properties of an elastomer and the durability of a spring washer, particularly if the front and rear ends of housing 48 are subjected to different environmental conditions.

As illustrated in FIG. 2, flexible mount housing 48 may be fabricated with external threads 108 so that the entire cylinder and flexible mount assembly may be threaded as a unit into a system bulkhead or other support member in substantially the same manner as a rigidly mounted cylinder illustrated in FIG. 1. External threads 108 are applicable to all of the hereinabove described embodiments and may in particular facilitate retrofitting.

Figure 6:
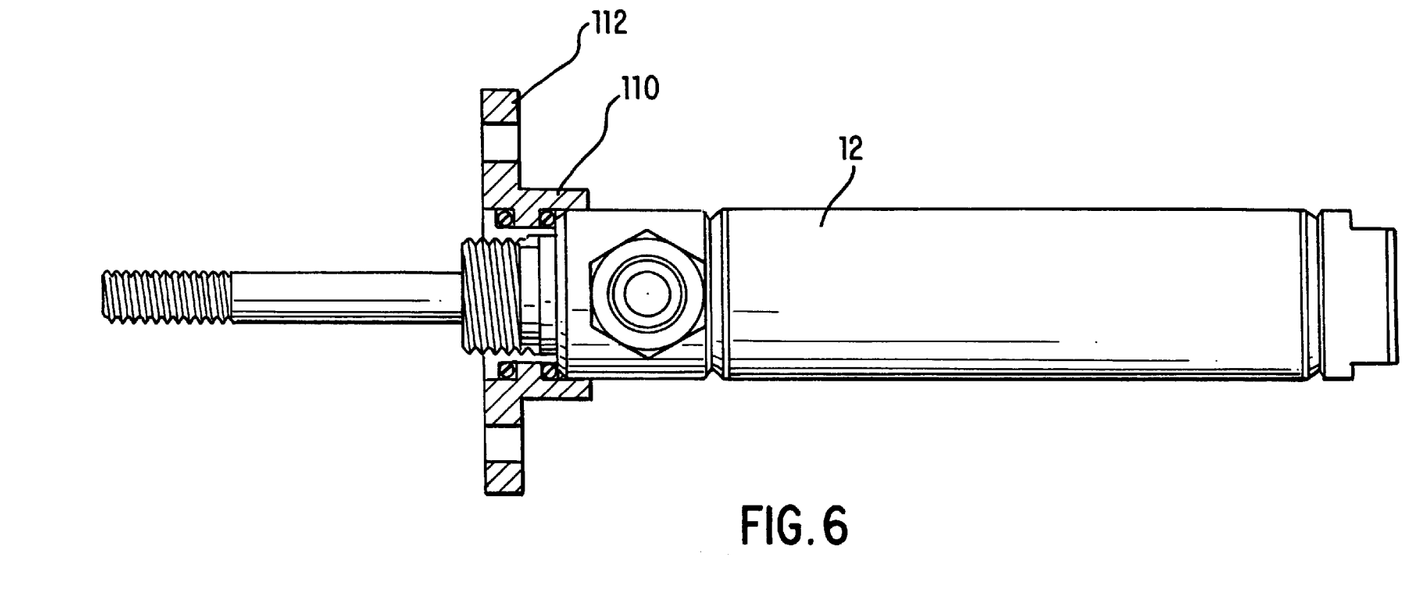
FIG. 6 illustrates a flange mounted version of the preferred embodiments.

As illustrated in FIG. 6, a flexible mount housing 110 may be fabricated with a flange 112, by which the cylinder and flexible mount assembly may be attached as a unit to a system bulkhead or other support member by means of appropriate fasteners. Flanged mount housing 110 is applicable to all of the hereinabove described embodiments. Other methods of attachment to a system bulkhead or support member include structures incorporating the principal features of housing 48, for example incorporating the housing function integral with a system bulkhead or support member.

Figure 7:
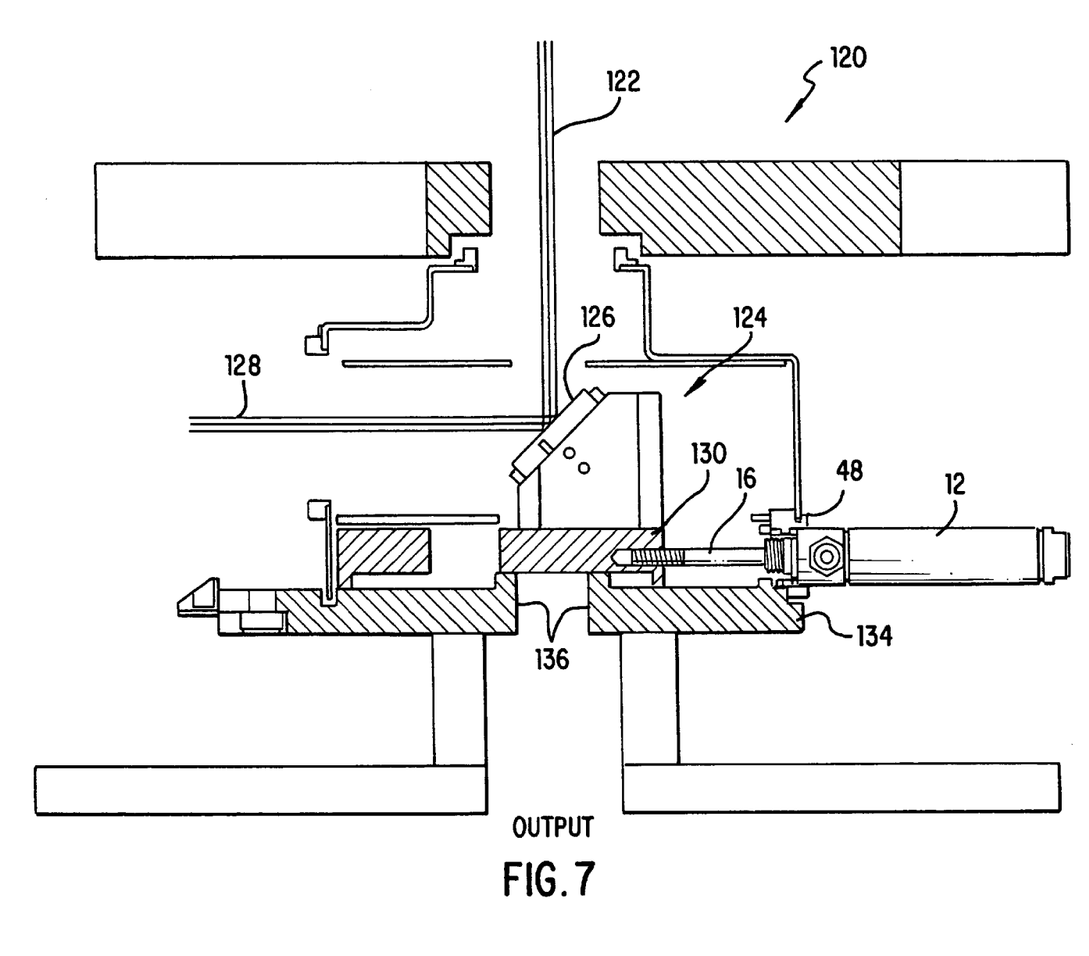
FIG. 7 illustrates the integration of an embodiment with the shutter assembly of a laser or optical system.

An example of the use of the invention in conjunction with the control of a shutter assembly in a laser or optical system 120 is illustrated in FIG. 7. An incident optical beam 122 enters optical system 120 and is blocked by a shutter assembly 124. Shutter assembly 124 incorporates an optically reflective surface 126 disposed at an angle with respect to incident optical beam 122. Reflective surface 126 deflects incident optical beam 122 from its original path into a reflected optical beam 128, which may then propagate to a different part of the system or to an optical absorber or "beam dump" (not shown). Shutter assembly 124 also incorporates a mechanical stage 130, which is slidably mounted to rails (not shown) disposed transversely to incident optical beam 122. Mechanical stage 130 is connected rigidly to piston rod 16 of hydraulic or pneumatic cylinder 12, which in turn is mounted in accordance with the invention within flexible mount housing 48. Housing 48 in turn is fastened rigidly to a support member 134 of system 120, such that the axis of cylinder 12 and piston rod 16 is substantially parallel with the rails.

In operation, control valves (not shown) admit pressurized gas or hydraulic fluid into cylinder 12, causing piston rod 16 to retract into cylinder 12, drawing shutter assembly 124 toward cylinder 12, and thereby permitting the undeflected optical beam to propagate through an aperture 136. When the control valves release the pressurized gas or hydraulic fluid from cylinder 12, piston rod 16 is extended through the force of springs mounted internal to cylinder 12, thereby returning shutter assembly 124 along the rails to its original beam deflecting position.

Flexibly mounting of cylinder 12 within housing 48 as described in the embodiments permits offset and tilt misalignment of the cylinder within housing 48, allowing alignment of the cylinder to be dictated by the axis of the rails on which shutter assembly 124 traverses. This eliminates tedious manual alignment procedures and prevents binding of the mechanism, which may otherwise lead to friction, uneven travel of mechanical stage 130, chatter, vibration, improper positioning or jamming of shutter assembly 124, or damage to mechanical stage 130, piston rod 16, or cylinder 12.

Mounting of cylinder 12 in accordance with the embodiments also provides cushioning of mechanical shock and permits discretionary rotational orientation of cylinder 12 to facilitate access to side fittings 26.

The hereinabove embodiments describe flexible mounts generally configured separately from and attachable to supported mechanisms, for example pneumatic or hydraulic cylinders, and therefore potentially useful for retrofitting. However, the techniques hereinabove disclosed may also be applied to other configurations, for example a flexible mounting structure manufactured integrally with a supported mechanism. In addition to hydraulic and pneumatic cylinders, the invention is applicable to the flexible mounting of other mechanisms incorporating reciprocating or rotating mechanisms having axes of symmetry, including push rods and rotating shafts.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An apparatus comprising:

a rigid housing incorporating an inside surface comprising a through hole with a clearance diameter and comprising at least one counterbore having a diameter larger than said clearance diameter of said through hole, said through hole and said at least one counterbore being concentric about a common housing axis;

at least one resilient member;

a rigid retainer incorporating an outside cylindrical surface and an inside surface substantially concentric about a common retainer axis, at least one end of said outside cylindrical surface having a diameter smaller than said clearance diameter of said through hole of said housing;

means to prevent said retainer from passing entirely through said through hole of said housing;

means to cause said retainer to capture and compress said at least one resilient member against said inside surface of said housing; and means to attach said retainer rigidly to a mechanism incorporating a movable rod, such that said retainer is held captive within said housing.

2. The apparatus of claim 1 wherein said at least one resilient member comprises an elastomeric O-ring.

3. The apparatus of claim 1 wherein said at least one resilient member comprises a spring washer.

4. The apparatus of claim 1 wherein said means to prevent said retainer from passing entirely through said through hole of said housing and said means to cause said retainer to capture and compress said at least one resilient member against said inside surface of said housing comprise an outer flange rigidly affixed to said retainer, an outer diameter of said flange being larger than said clearance diameter of said through hole and smaller than said diameter of said at least one counterbore.

5. The apparatus of claim 1 wherein said means to attach said retainer rigidly to said mechanism such that said retainer is held captive within said housing comprises inside threads integral to said retainer and an outer flange rigidly affixed to said retainer and adjacent to an end of said retainer distal from said mechanism.

6. The apparatus of claim 4 wherein said means to attach said retainer rigidly to said mechanism such that said retainer is held captive within said housing comprises inside threads integral to said retainer and said outer flange rigidly affixed to said retainer and adjacent to an end of said retainer distal from said mechanism.

7. The apparatus of claim 1 wherein said housing further comprises a counterbore concentric about said housing axis and encircling a periphery of said mechanism, thereby creating a substantially annular clearance between said housing and said mechanism.

8. The apparatus of claim 1 wherein said mechanism incorporates a rotating shaft.

9. The apparatus of claim 1 wherein said mechanism incorporates a reciprocating rod.

10. The apparatus of claim 9 wherein said reciprocating rod is connected to a piston slidably contained within a hydraulic or pneumatic cylinder.

11. The apparatus of claim 10 wherein said reciprocating rod is further attached to a load comprising a shutter assembly in an optical system.

12. A method for flexibly supporting a mechanism, comprising:

placing a substantially annular resilient member around the circumference of a substantially cylindrical rigid retainer having a front end, an outer diameter with a substantially annular flange protruding outward therefrom adjacent to said front end, an inner diameter, and a rear end; said resilient member being positioned adjacent to said flange;

inserting said rear end of said retainer through a through hole within a rigid housing, said through hole having an inside diameter larger than an outside diameter of said rear end of said retainer and smaller than an outside diameter of said flange;

attaching said rear end of said retainer rigidly to said supported mechanism, such that said flange of said retainer captures and compresses said resilient member against a surface of said housing.

13. The method of claim 12 wherein said resilient member comprises an elastomeric O-ring.

14. The method of claim 12 wherein said resilient member comprises a spring washer.

15. The method of claim 12 wherein said retainer is rigidly attached to said mechanism by means of inside threads integral to said retainer.

16. The method of claim 12 further comprising the step of positioning a counterbore in said housing concentric with said through hole of said housing, said counterbore encircling a periphery of said mechanism, thereby creating a substantially annular clearance between said housing and said mechanism.

17. The method of claim 12 wherein said mechanism incorporates a rotating shaft.

18. The method of claim 12 wherein said mechanism incorporates a reciprocating rod.

19. The method of claim 18 wherein said reciprocating rod is connected to a piston slidably contained within a hydraulic or pneumatic cylinder.

20. The method of claim 19 wherein said reciprocating rod is further attached to a load comprising a shutter assembly in an optical system.

* * * * *